US005999248A

United States Patent [19]

Wary et al.

[11] Patent Number: 5,999,248

[45] Date of Patent: Dec. 7, 1999

[54] ELONGATED RECORD MEDIUM STORAGE AND TRANSPORT SYSTEM AND METHOD

[75] Inventors: Joseph C. Wary, Chatsworth; Gerald M. Painter, Long Beach; Colin F. Mossman, Los Angeles, all of Calif.

[73] Assignee: DeLuxe Laboratories Inc., Hollywood, Calif.

[21] Appl. No.: 09/033,343

[22] Filed: Mar. 2, 1998

[51] Int. Cl.[6] .............................. G03B 27/62; G03D 3/08

[52] U.S. Cl. ......................... 355/75; 396/612; 226/118.2; 226/189; 355/27

[58] Field of Search .................................. 355/27–29, 75, 355/72; 396/612, 646; 226/118.1, 118.2, 189; 242/163, 364.3

[56] References Cited

U.S. PATENT DOCUMENTS

| | | | |
|---|---|---|---|
| 2,242,751 | 5/1941 | McFarland | 226/189 |
| 3,693,860 | 9/1972 | Gay | 226/118.2 |
| 3,695,534 | 10/1972 | Treise | 242/615.1 |
| 3,734,370 | 5/1973 | Shumaker | 226/118.2 |
| 3,743,195 | 7/1973 | Bagdasarian | 226/118.1 |
| 4,009,814 | 3/1977 | Singh | 226/113 |
| 4,577,516 | 3/1986 | Wyser | 83/919 |
| 4,930,672 | 6/1990 | Renzo | 226/118.3 |

*Primary Examiner*—D. Rutledge

*Attorney, Agent, or Firm*—Whitman Breed; Abbott & Morgan LLC; Gregor N. Neff

[57] ABSTRACT

An elongated record medium, such as motion picture film, is stored and transported in a plurality of banks of successive loop-forming rollers, with smaller banks of rollers being nested within the loops formed by a bank of larger rollers, and the record medium is transferred between the banks of rollers. The invention provides a relatively high capacity storage system which is very compact. It is used, for example, in storing film for feeding through a negative motion picture film printer, and for storing negatives in release print film production, and in accumulators for use in a variety of handling uses.

17 Claims, 7 Drawing Sheets

178
188
134
184
186
190
183
180
178
74

160
162
174
170
136
172
176
169
166
164
76
160

146
152
138
156
154
158
148
151
78
146

ELONGATED RECORD MEDIUM STORAGE AND TRANSPORT SYSTEM AND METHOD

This invention relates to the storage and transport of an elongated record medium, and particularly to the storage and transportation of motion picture film.

The production of so-called "release prints" of motion picture films presents substantial problems in the handling of an elongated record medium, namely, the motion picture film.

Because release prints must be distributed to motion picture display houses promptly after the film has been shot and prepared for release, and large numbers of such prints are required, speed in making the prints is very important.

Accordingly, in the past, the film commonly has been handled by providing a series of racks with upper and lower rows of film rollers with the film moving over the rollers in the form of successive loops. The racks store substantial quantities of film and the rollers allow the film to move at a relatively high speed.

A substantial problem recognized by the inventors is that such prior art roller racks take up very substantial amounts of space. Substantial numbers of the racks have to be connected together in series to store a single long negative used in making release prints, and the racks occupy unnecessarily large amounts of floor space.

In feeding raw film stock into and out of a release printer, it is highly desirable to allow the printer to run continuously so as to maximize production. However, the raw stock comes in sections of finite length. Accumulators are used in order to store up an amount of raw stock or finished product, as the case may be, while the other end of the film is stationary for splicing to the next piece of raw stock, etc.

Such accumulators tend to be very tall. For example, typical accumulators used today are over twenty feet tall. This causes poor utilization of space and excessive costs due to the large vertical open spaces which must be provided for them.

Accordingly, it is an object of the present invention to provide an elongated record medium storage and transport device and method which eliminate or alleviate the foregoing problems; particularly a device which has a greatly increased storage capacity per unit volume.

Furthermore, it is an object of the invention to provide such a device and method in which the storage and transportation devices can be used in combinations which maximize the utilization of operating personnel time as well as space.

It also is an object of the invention to provide such a device and method in which the transport and storage system is sturdy, reliable, and easy to locate relative to other equipment with which it is to be used.

In accordance with the present invention, the foregoing objectives are satisfied by the provision of a multi-bank storage and transport device in which a plurality of banks of successive loop-forming rollers are nested one within the other and interconnected with one another so as to provide a greatly increased storage capacity in the same amount of space.

In a preferred embodiment of the invention, three banks of rollers, each consisting of an upper row and a lower row of rollers, are provided. The rollers of the second bank are smaller in diameter than the rollers of the first bank, and the rollers of the third bank are smaller than the rollers of the second bank. The second bank is nested within the loops of the first, and the third bank within the loops of the second.

The rollers forming the upper rollers of the three banks are secured together and are movable towards and away from the lower rollers to lengthen or decrease the distance between rollers in each bank, thus increasing or decreasing the storage capacity and/or the tension on the record medium being transported.

A negative printing system is provided in which multi-bank storage devices are provided for storing and feeding film to and from a negative printer, there being two negatives for each film segment, one carrying the sound information, and the other carrying the picture information. The two negatives are printed in synchronism with one another.

The multi-bank storage device also is used in forming an accumulator which can be made much shorter than in the past.

Multiple multi-bank storage and transport units can be provided for storing and retrieving negatives from a release printer. One such unit can be in operation supplying negative to the printer, while one or two other such units are available for loading or storing extra negative for use in a later printing run. This minimizes idle time for the printer and production employees.

The foregoing and other objects and advantages of the invention are set forth in or will be apparent from the following descriptions and drawings.

IN THE DRAWINGS

Figure 12:
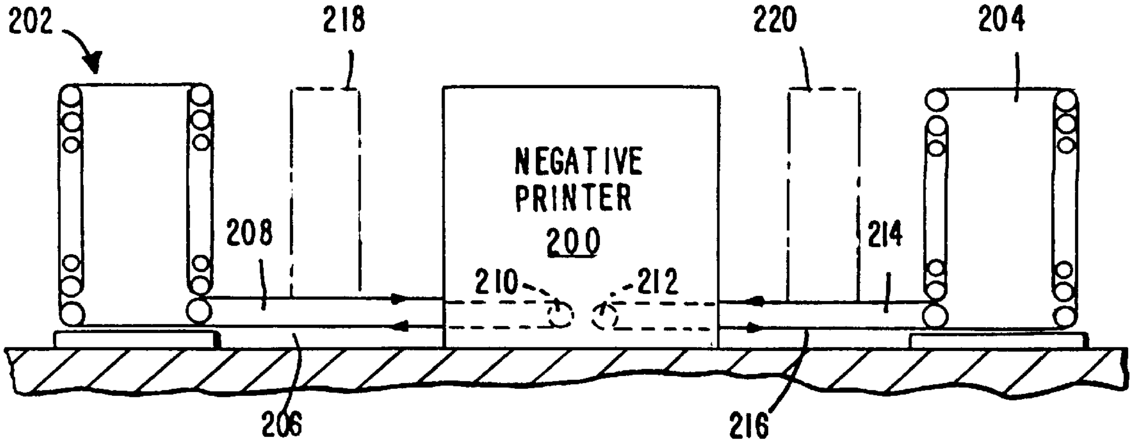
Figure 8:
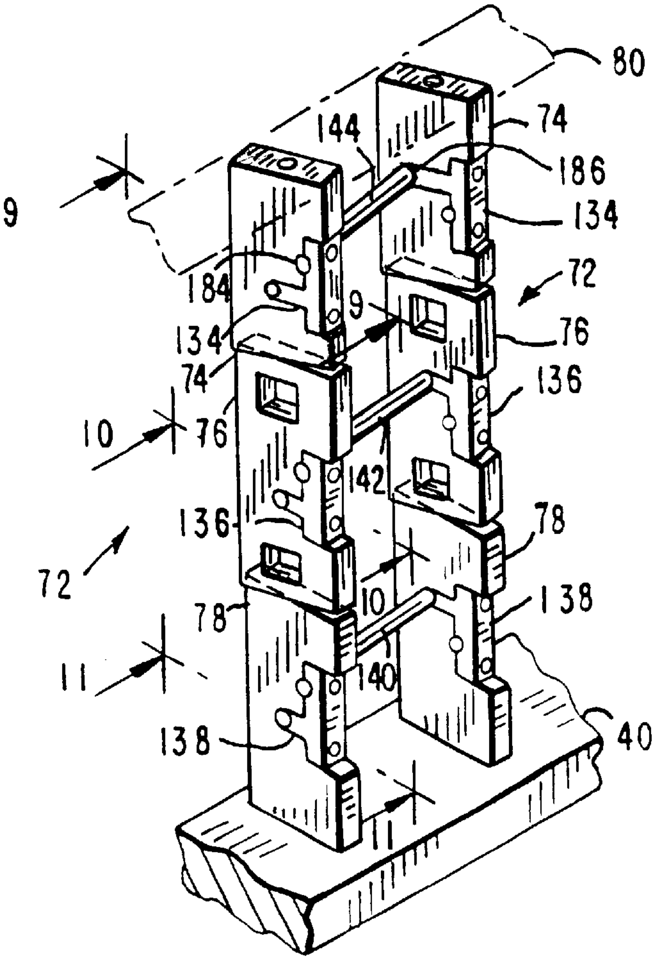
FIG. 8 is a partially schematic perspective view illustrating some of the support members for rotatably supporting the rollers of the FIG. 1 structure.
Figures 9, 10, 11:
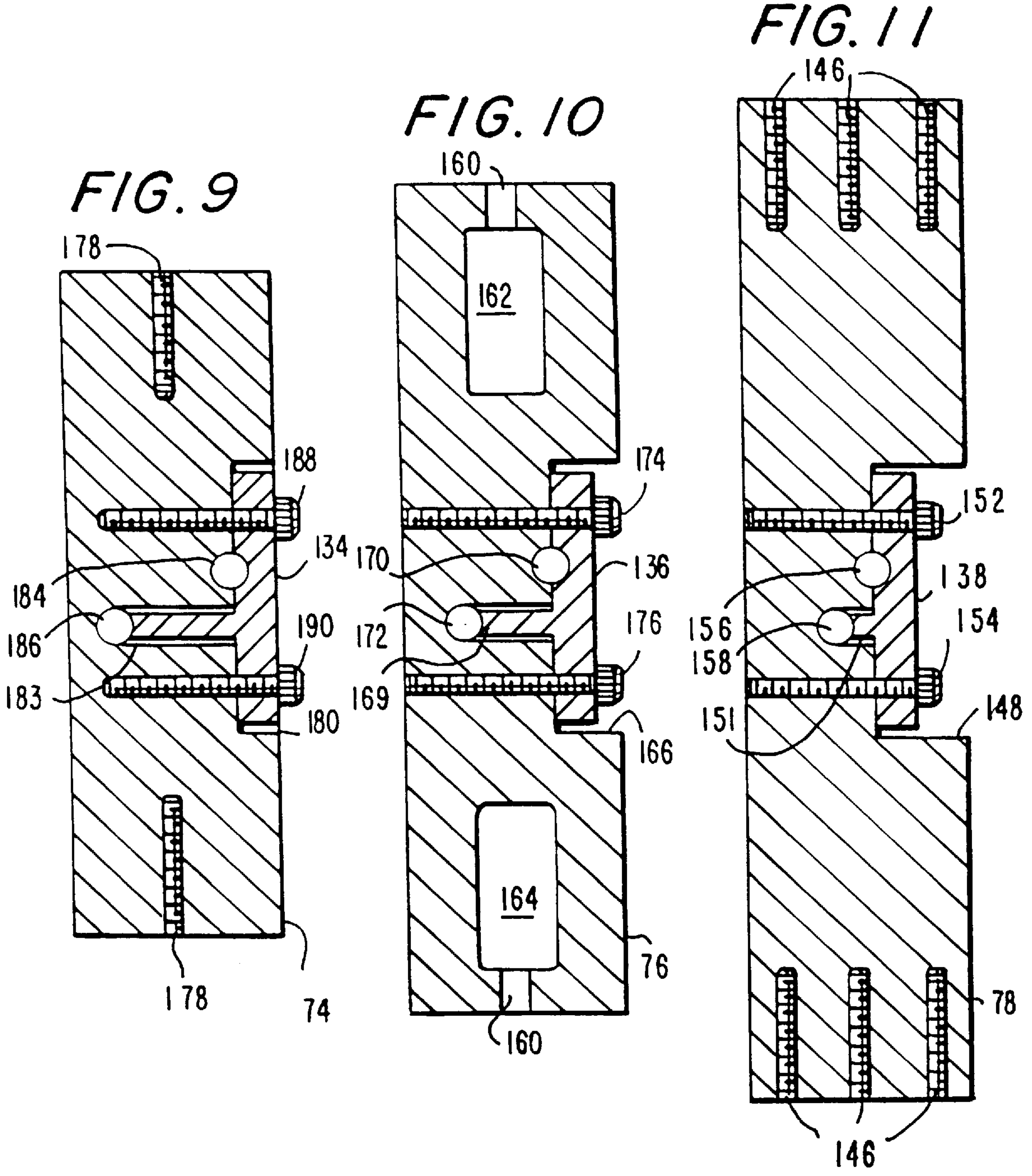
Figure 13:
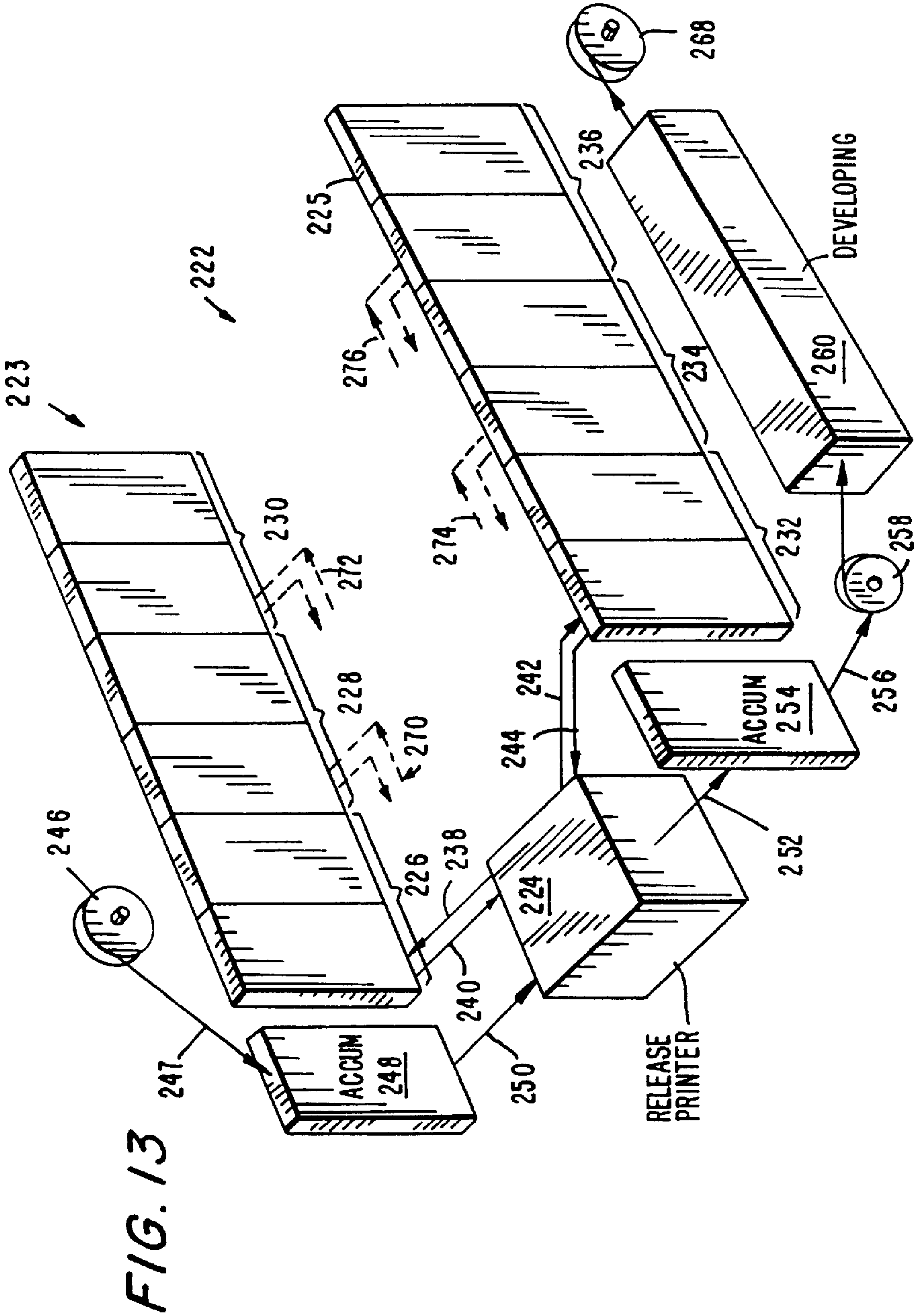

FIGS. 9, 10 and 11 are cross-sectional views taken, respectively along lines 9—9, 10—10, and 11—11 of FIG. 8;

FIG. 12 is a schematic diagram of a system for printing negatives in accordance with the present invention; and FIG. 13 is a schematic perspective view of a release printing system utilizing the present invention.

GENERAL DESCRIPTION

Figure 1:
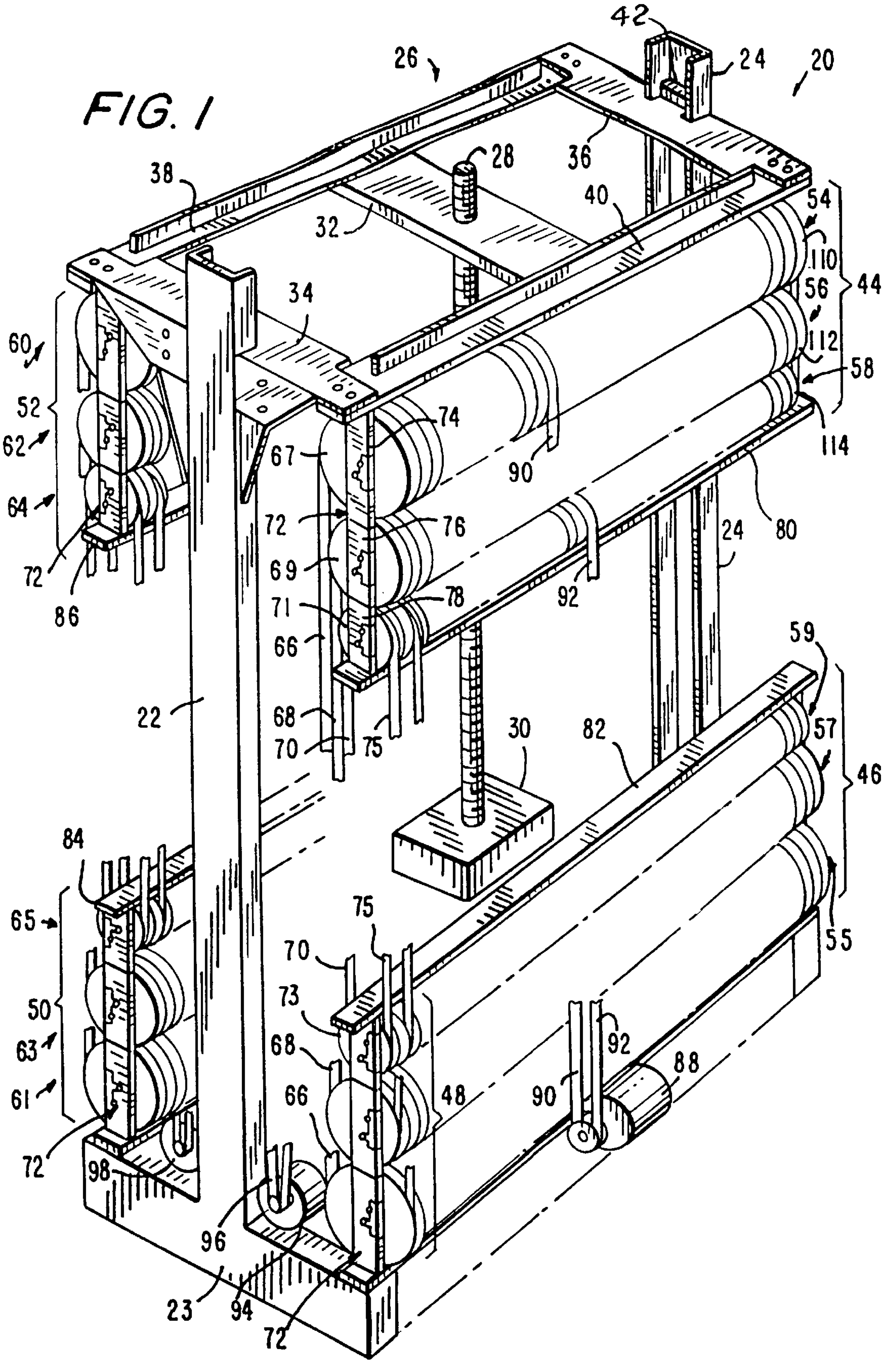
FIG. 1 is a partially schematic perspective view of a multi-bank storage and transport device constructed in accordance with the present invention.

A preferred embodiment 20 of the storage and transport device of the invention is shown in FIG. 1.

The device 20 includes two vertical support and guide rails 22 and 24, a top frame 26, and a ball-screw elevator structure consisting of a long vertical screw member 28 engaging a plate 32 in the top frame 26, and a screw drive mechanism 30 shown schematically to rotate the screw 28 to raise and lower the top frame 26 relative to the rest of the device 20.

The top frame 26 consists of a pair of side bars 38 and 40, and a pair of end bars 34 and 36. The structure of the top frame 26 and the C-shaped rails 22 and 24 is such as to allow the top frame to travel upwardly and downwardly under the guidance of the members 22 and 24 on linear bearings, one of which is indicated schematically at 42. The rails 22 and 24 are supported by a platform 23.

Suspended from the side rail 40 is a group 44 of three rows of rollers 54, 56 and 58. Similarly, suspended from the other side bar 38 is a group 52 of three rows of rollers 60, 62 and 64.

Supported on the platform 23, so as to be up-standing, is a first group 46 of three rows of rollers 55, 57 and 59. Similarly, on the opposite side of the structure is another group 50 consisting of three rows of rollers 61, 63 and 65.

Roller Banks

The rollers shown in FIG. 1 are arranged in what will be called "banks", for the sake of convenience in this description. Each bank consists of an upper row of rollers of a given size, and a lower row of rollers arranged in a complementary fashion with the rollers in the upper row, as it will be explained in greater detail below.

Thus, in FIG. 1, a first roller bank consists of the uppermost row 54 together with the lower-most row 55 of rollers. Each of the rollers in the rows 54 and 55 are of the same diameter. It should be understood that each of the rows of rollers consists of a substantial number of rollers spaced closely to one another. Not all of the rollers in each row are shown, for the sake of simplicity in the drawings, but their presence is indicated by dashed lines.

A second bank of rollers consists of the middle row 56 in the group 44, and the middle row 57 in the lower group 46. Again, the diameters of the rollers in rows 56 and 57 are the same. In accordance with the present invention, the diameter of these rollers is substantially less than the diameter of the rollers in rows 54 and 55.

A third bank of rollers consists of the inner-most row 58 of the upper group 44 and the inner-most row 59 of the lower group 46. The rollers in these two rows are of the same diameter, but are of a diameter smaller than that of the rollers in the middle rows 56 and 57.

The rollers in rows 56 and 58 are positioned immediately below the rollers in upper row 54, and the rows 57 and 59 are positioned immediately above the rollers in row 55. Thus, the two inner banks of rollers are nested within the film loops formed by the outermost rows of rollers 54 and 55. This greatly increases the storage capacity of the structure—by almost three times—in the same space occupied by prior roller devices.

Figure 2:
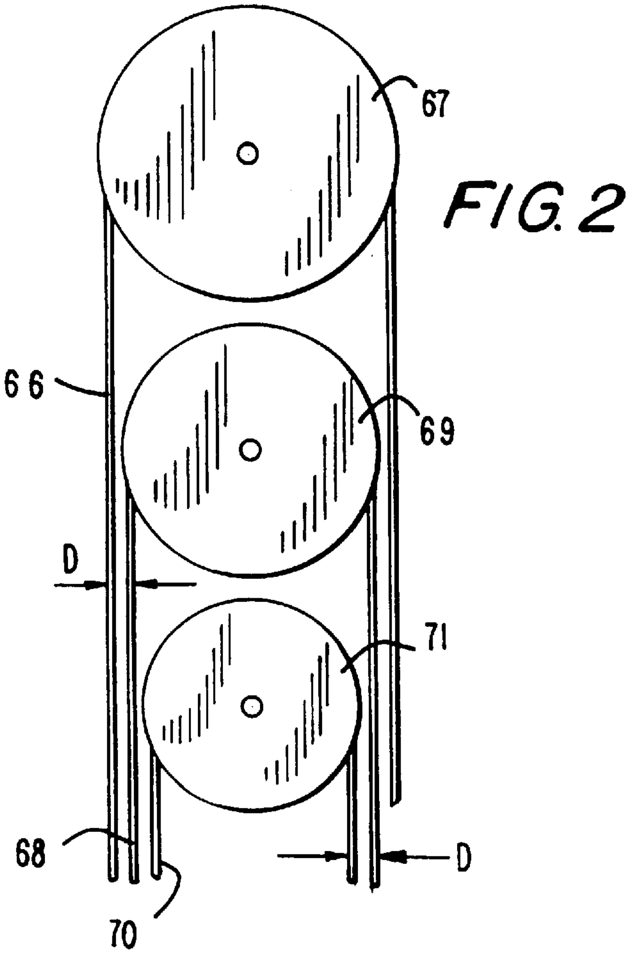
FIG. 2 is a schematic diagram illustrating the spatial relationships between several of the rollers and the film on those rollers in the device shown in FIG. 1.

FIG. 2, as well as FIG. 1, show the forward end rollers in each of the top three rows 54, 56 and 58. These are rollers 67, 69 and 71. Sections of film extending from the upper roller to the lower roller in each row within a given bank are shown at 66, 68 and 70, respectively.

As it can be seen, the distance D between the vertical strands of film 66, 68 and 70 is substantial so that the film segments can move upwardly and downwardly without interference or contact with one another.

In practice, a device which has successfully been built and tested and uses rollers of five inch outside diameter in the upper row 54, four inch diameter in the middle row 56, and three inches diameter in the lower or innermost row 58. This leaves one-half inch spacing between adjacent strands of film.

Since the roller groups 50 and 52 on the opposite side of the machine are duplicates of the groups 46 and 44 on the front side of the machine, it should be understood that the description applicable to the multi-bank structures on both sides of the unit are the same.

Figure 3:
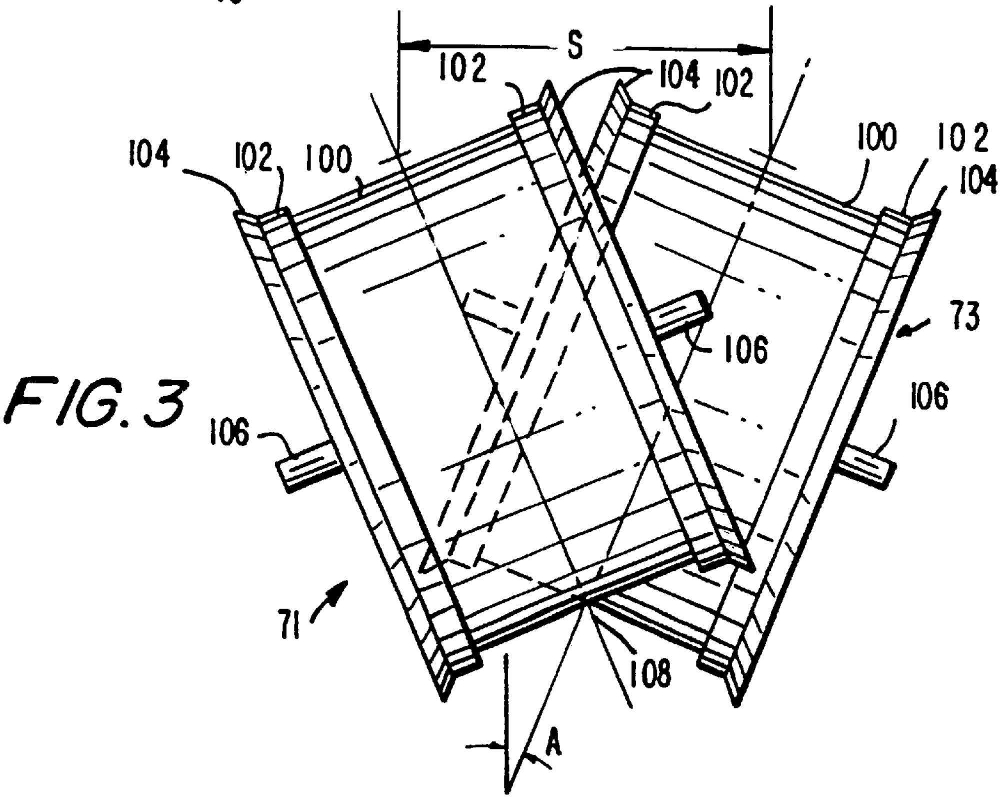
FIG. 3 is a schematic diagram illustrating the relative positions of complementary upper and lower rollers used in forming each film loop.

The complementary relationship between successive upper and lower rollers in each bank is illustrated in FIG. 3.

FIG. 3 is a schematic diagram showing two rollers in the innermost bank of rollers, numbers 71 and 73, in FIG. 1. The figure is a top plan view schematically showing the vertical and angular positioning of the rollers with respect to one another.

Each roller 71 and 73 includes a molded plastic body having an outer beveled portion, a pair of film-carrying annular support surfaces 102, and a recessed center portion 100. This type of roller is well known for use in handling negative film which does not carry sound. The recess 100 prevents contact between the roller and the central portion of the film which carries the picture images, and thus minimizes scratching and wear on that portion.

Film rollers for negatives bearing only sound information (not shown) have raised central portions and recessed portions near the edges to protect the edge areas from the sound information is recorded.

Mounted in the roller body is an axle 106 which is mounted in roller bearings so that the roller rotates smoothly and with low friction.

The spacing S shown in the upper portion of FIG. 3 is the spacing permitted between adjacent rollers. In practice, it is about 2 inches. The upper roller 71 and 73 are skewed at an angle A with respect to the bar 40 from which they are suspended. This angle is determined by positioning the two rollers so that their center lines cross at the point 108 in the plane of the film. What this does is it causes the film to twist, as it moves from the upper to the lower roller, through an angle sufficient to move it from one roller to the next adjacent roller, and then to the next roller, etc., to form successive film loops along the length of the row.

Figure 4:
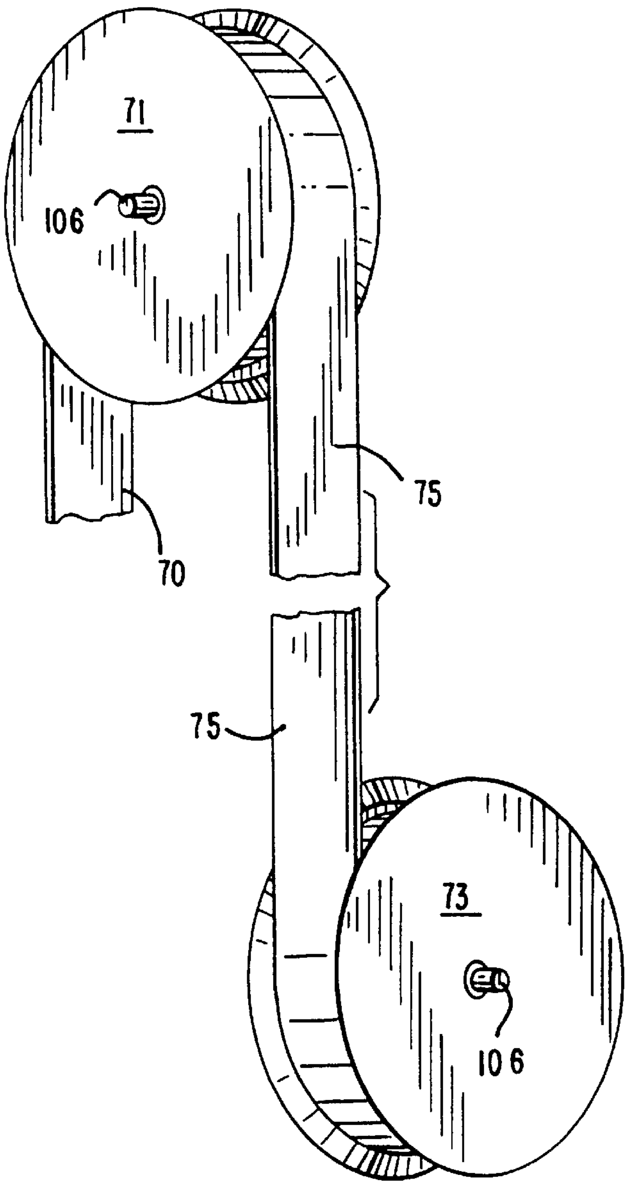
FIG. 4 is a schematic perspective view illustrating the formation of film loops by the device shown in FIGS. 1 through 3.

FIG. 4 is a perspective view showing the rollers 71 and 73 schematically in their vertical orientation with respect to one another. As it can be seen, the film arrives at the top of roller at 70 and passes over the top of that roller and then downwardly to the roller 73, and then upwardly at 81 towards the next adjacent roller in the upper row.

All of the rollers in the upper row 58 are mounted at the same skew angle A, and all of the rollers in the lower row 59 are mounted at the same complementary skew angle as that shown for the roller 73 in FIG. 3. Thus, the rollers in each row are parallel to one another.

It should be apparent from FIG. 3 that the skew angle of each of the larger rollers in rows 54 and 56 will be different from the skew angle A for the smaller rollers in FIG. 3. This is because the diameters of the rollers in the upper and middle rows of rollers are different from one another and different from the diameter of the rollers for the innermost rows. As the diameter of the rollers increases, the skew angle decreases.

Transfer Between Banks

Figure 6:
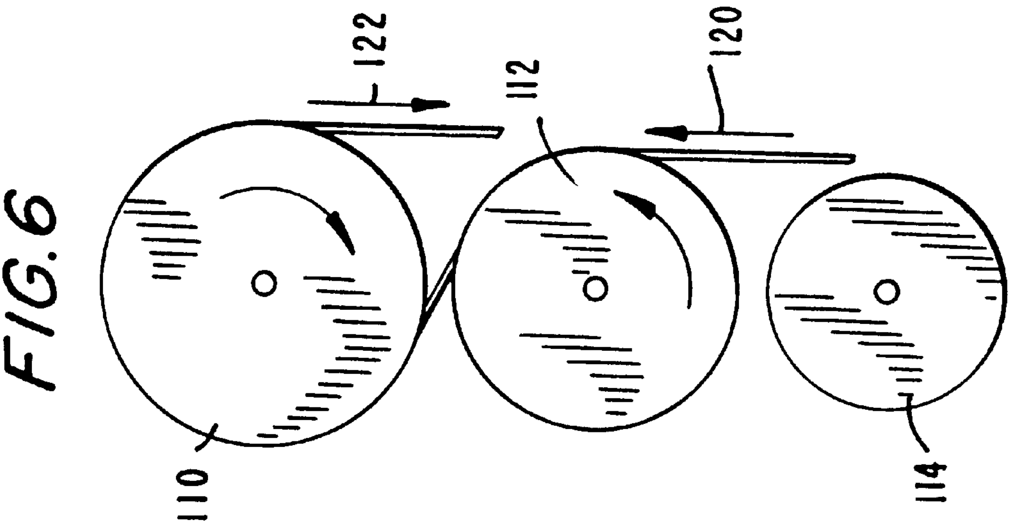
FIG. 6 is a schematic view showing the transfer of film from the middle row to the top row of the device shown in FIG. 1.
Figure 5:
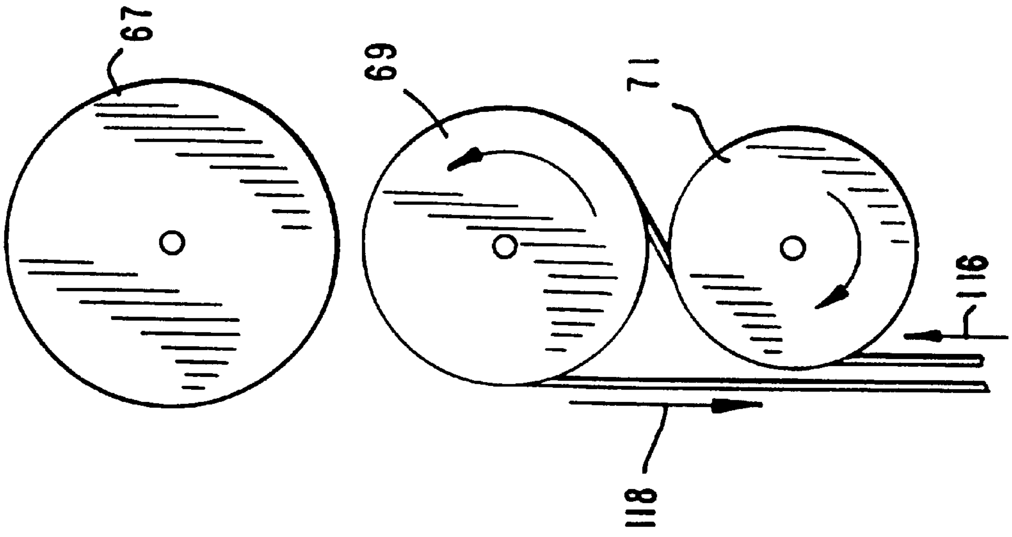
FIG. 5 is a schematic view illustrating the transfer of film from the bottom row of rollers to the middle row in the device of FIG. 1.

FIGS. 5 and 6 show schematically how elongated record medium (film) is transferred from one bank to the next.

FIG. 5 shows the three rollers 67, 69 and 71. In the preferred scheme of winding the film on these rollers, the transfer takes place between the innermost bank and the intermediate bank in the following manner. The film moves upwardly at 116 over a portion of the surface of the roller 71 and then moves upwardly around roller 69, and then downwardly as shown at 118, to continue to form loops in the second bank. Thus, the rollers in the inner bank rotate in a clockwise direction, whereas the rollers in the intermediate bank rotate in a counterclockwise direction.

FIG. 6 shows the transfer of film from the intermediate or middle bank to the outer bank of rollers. This transfer takes place at the far end of the upper group of rollers 44, involving rollers 110, 112 and 114, by way of example.

Film travels upwardly at 120 and then over a portion of the surface of the roller 112, and then upwardly to be wrapped around the roller 110 and then moves downwardly at 122. Thus, the rollers in the upper row rotate clockwise while those in the intermediate row rotate counterclockwise. The film at 122 then proceeds to form successive loops in the outermost bank of rollers.

When a particular point on the film has traversed the entire three banks of rollers on one side of the machine, then it is transferred to one of the three banks of rollers on the other side of the machine, by way of transfer rollers (not shown).

Entry and Exit

In multibank units such as the unit 20 shown in FIG. 1 having three nested banks, the film enters the storage device at one end, e.g., the right-hand end in the FIG. 1 device, and leaves at the opposite end, e.g., the left-hand end in the FIG. 1 structure.

In multibank units having only two banks, the film leaves the device from the same end at which it arrives.

In all cases, appropriate sets of rollers (not shown) are provided to convey the film into and out of the storage and transport device, as with prior art roller racks.

Intermediate Drive

Film traveling to and from the storage and transport device 20, such as at 206 and 208 in FIG. 12, usually is pulled into the utilization machine by a sprocket feed wheel. However, because so much film is stored in the device 20, it is desirable to provide intermediate drive motors, such as the sprocket drive motors shown at 88 and 94 in FIG. 1. In fact, in the structure shown in FIG. 1, four intermediate drive motors are provided, one at the midpoint of the banks of rollers at each side of the device, and one at each end as the film moves between the front and back sides of the structure.

Figure 7:
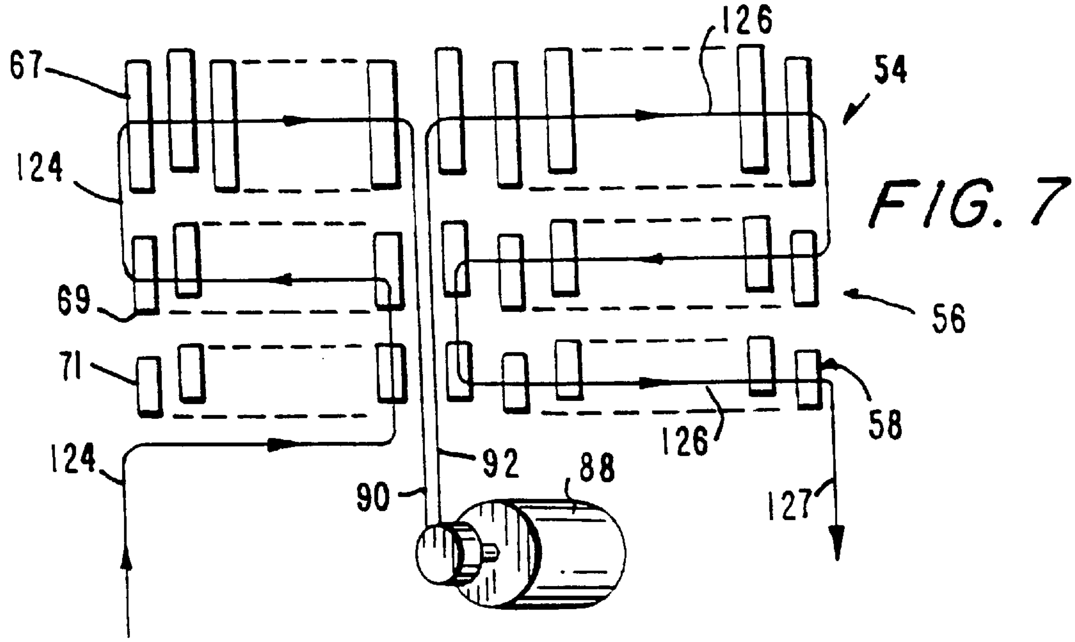
FIG. 7 is a schematic view showing the preferred threading scheme for threading the film on the rollers of the device shown in FIG. 1.

FIG. 7 schematically shows a preferred mode of threading the film to make the intermediate drive by the motor 88 in the middle of the banks of rollers feasible.

First, the film is threaded onto the rollers on the innermost row at the left. Then, the film moves towards the right, as shown by the arrows on the flow path. The first transfer of film between the lower and intermediate rows takes place about midway between the ends of the rows. Then the film travels back to the left and is transferred up to the upper row at 24, and then downwardly at 90 to the drive motor 88. Then the film at 92 travels upwardly to the upper row and progresses through the upper row 54 as shown at 126, and then moves downwardly and to the left through the intermediate row 56 and then downwardly to the lower row 58 and either out of the storage unit at 127, or to the other side of the unit.

Roller Mounting

The special mounting structure provided for the rollers is illustrated in FIGS. 8 through 11, as well as in FIG. 1.

Referring first to FIG. 1, each group 44, 46, 50 and 52 of rows of rollers is supported by a plurality of vertical supports 72 made up of three segments secured end-to-end, and a cross-bar 80, 82, 84 or 86. Each vertical support 72 consists of a long segment 74, an intermediate length segment 76, and a short segment 78. There is one support structure 72 between each adjacent group of three vertically aligned rollers, as well as one at each end of the row.

FIG. 8 is a perspective, partially schematic view showing two of the supports 72 attached between the side bar 40 and the cross-bar 80. It should be noted that the elements 72 are shown inverted from their representation in FIG. 1, for the sake of clarity of the drawings.

Referring now to FIGS. 8 through 11, each of the long members 78 (see FIG. 11) consists of a rectangular bar with a rectangular cutout 148 with a generally T-shaped insert 138 secured in place by means of two screws 152 and 154 threaded into holes in the rectangular bar 78.

The insert 138 with a projection 151 forms a portion of each of two holes 156 and 158 which are provided to receive the axles of the rollers. When the screws 152 and 154 are removed and the insert 138 removed, the holes 156 and 158 are open for the easy removal of a roller from the supports so that the rollers can be removed, serviced and/or replaced.

Three threaded mounting holes 146 are provided in each end of the bar 78.

Referring to FIG. 8, three threaded fasteners (not shown) are threaded upwardly through the bar 40 into the three holes 146 in one end of each of the members 78 to secure them in place.

The intermediate support member 76 shown in FIG. 10 includes a pair of cutout holes 162 and 164 and an axial unthreaded hole 160.

A T-shaped insert 136 similar in shape to the insert 138 is secured in a recess 166 by a pair of screws 174 and 176. The insert 136, with its projection 169 similar to the projection 151 of the element 138 in FIG. 11, forms half of the holes 170 and 172. Those holes are spaced farther apart than the holes 156 and 158 in FIG. 11. Therefore, the projection 169 is longer and the recess 166 shallower than the corresponding parts in FIG. 11.

The short member 74 shown in FIG. 9 has a pair of threaded axial holes 178 in its ends, and a T-shaped insert 134 in recess 180 together with projection 183, forming holes 184 and 186. The holes 184 and 186 are farther apart than the similar holes shown in FIGS. 10 and 11.

As it can be seen in FIG. 8, when the members 72 are assembled, the member 78 is inverted relative to the member 78 next to it; the member 76 is inverted relative to the member 76 next to it, and the same is true for the members 74. This arrangement allows standardized parts to be made for each of the elements 74, 76 and 78. The mounting holes in both ends of each element are made the same so that each can be mounted in either orientation.

Axles 140, 142 and 144 are shown inserted in the respective axle receiving holes. As it can be seen, each of the axles 140, 142 and 144 is at a different skew angle relative to the bar 40. Similarly, the members 76 are rotated axially with respect to the members 78, and the members 74 are rotated further with respect to the members 76.

This adjustment of angular position of the various members is made possible by fastening the short member 74 to the bar 80 with a single threaded fastener inserted into the hole 178 so that the member 74 can rotate axially. Similarly, the member 76 can rotate axially because of its mounting by means of the unthreaded hole 160 with a fastener inserted and screwed into the hole 146 or 178 in the next member. Thus, whereas the long member 78 is fastened by three fasteners to the bar 40 and, thus, cannot rotate, the other two members can rotate with respect to one another and the member 78 so as to insure the proper alignment of the rollers in each row.

By inverting the parts of the members 72 in alternating fashion, the axles 140, 142 and 144 can be inserted into one of the two axle-receiving holes in each of the separate members. For example, the axle 144 in FIG. 8 is inserted through the hole 184 in the front member 74 and through the hole 186 in the rear member, thus mounting the axle 144 with the proper skew angle.

It should be apparent from this description that adjacent vertical rows of rollers will be slightly displaced upwardly and downwardly from one another, as it is shown schematically in FIG. 7. This further facilitates the manufacture of standardized mounting members of only three types, those shown in FIGS. 9 through 11.

In short, the structure shown and described above is ideally adapted to make an adjustable support structure to automatically position the members in the proper position.

Moreover, by the use of the T-shaped inserts 134, 136 and 138, which are easily removable by simply removing two screws, individual rollers which require replacement can be removed and replaced easily without totally disassembling the entire structure.

Negative Printing System

FIG. 12 is a schematic diagram of a negative printing system for making film negatives.

Typically, two negatives are used for making release prints; one which bears only the sound information, and another which bears only the picture information. The sound information usually must be in four different formats, as it is well known.

The system shown in FIG. 12 includes a negative printer 200, which prints sound and picture information simultaneously on two different long film strips in synchronism with one another. The system includes two multi-bank film storage and transport devices 202 and 204 which are substantially as shown in FIG. 1.

Film for use in making the sound negative first is moved in the direction 208 into the negative printer by means of a sprocket drive 210 and back to the storage device 202 over the path 206.

Similarly, film for use in making the negative containing the images is fed from the storage device 204 over path 214 to the negative printer by means of a sprocket drive 212 and returned as shown at 216.

In addition, optional multi-bank storage devices are shown in dashed outline at 218 and 220, each to store a negative for a trailer, which can be printed by the negative printer 200, if desired.

The process used for loading one of the storage devices 20, 202 or 204 will be described briefly.

The height of the top portion of the roller system can be adjusted by the elevator to adjust the capacity of the unit, to the length of negative to be printed.

Then, a length of leader film is hand-threaded into the roller system. Then, the film to be used to make the negative is spliced to the end of the leader, and the leader is run through the roller system until the film is loaded in place. In addition, a conventional tension detector 98 (FIG. 1) is provided in order to detect the tension in the film on the rollers. When the film starts moving, the tension detector adjusts the height of the device 202 or 204 to keep the tension on the film within desired limits.

After the film has been loaded in each of the storage devices 202 and 204, the film is threaded into the negative printer, and printing the two negatives in synchronism with one another proceeds until completed. The negatives then typically are joined end-to-end to form loops which are used in making release prints of the film.

Release Printing

FIG. 13 shows a system 222 using the present invention advantageously for producing release prints of motion picture films. The system includes two arrays 223 and 225 of multi-bank storage units. The group 223 is used for storing image-containing negative loops, and the group 225 is used for storing sound negative loops. Each of the groups 223 and 225 can include a number of different multi-bank units such as that shown in FIG. 1. Two such units are shown at 226, two more at 228, and a third set of two at 230. Similarly, two units are shown at 232; another two at 234 and a third at 236.

The image negative is in loop form and is supplied to the release printer 224 as indicated by arrow 240, and then is returned to the storage system as indicated at 238.

Simultaneously, the sound negative is delivered to the release printer 244 and returned as indicated at 242.

Simultaneously, raw film stock is supplied from a source 246 as indicated at 247, to an accumulator 248 which releases raw stock into the printer 224, as indicated by arrow 250.

As the raw stock is printed, it emerges as indicated at 252 and is sent to a second accumulator 254 and then as indicated at 256 to a storage at 258. Later, or immediately, as desired, the film is sent through a developing unit 260 and then is cut into standard lengths and stored on individual reels 268 after cleaning etc.

In accordance with the present invention, it is necessary to use only one group of multi-bank units 226 and another 232 at any one time to make release prints. This is compared with the necessity of using three of the prior racks in the same space simply for running one negative of ordinary length.

In accordance with the present invention, two groups of storage and transfer units 228 and 234 and 230 and 236 are not in use and can be loaded with a new negative while one negative is being run. Alternatively, all units can be loaded with repetitive copies of the same negative, or other arrangements can be used with great versatility to facilitate the maximum utilization of time and personnel.

Accumulator

In accordance with the present invention, the structure shown in FIG. 1 can be used as an accumulator as well as a simple storage and transport device.

The accumulators 248 and 254 operate to allow the release printer to run continuously. This is done by first reducing the height of the accumulator structure to its lowest level, and loading a quantity of raw stock from the supply 246. Usually, the supply consists of approximately 6,000 to 7,000 feet of film. Only a small fraction of this amount is loaded into the accumulator initially. Then, the release printer 224 is started and film is fed from the accumulator while it simultaneously is fed into the accumulator at a much higher rate of speed until the accumulator is full and elevated to a much higher level (e.g., over 20 feet) than when it started.

Then, just before the supply 246 runs out of film, it is necessary to stop the feeding of film into the accumulator and splice on a new roll to the end of the film. In order for the printer to remain in operation at the same speed, film which is stored in the accumulator is withdrawn and the elevator automatically lowers the top of the structure downwardly to reduce its capacity, thus allowing the input end of the film to remain stationary until the splice is completed, without stopping the printer. Then, when the splice is completed, film again is fed into the accumulator at a much higher rate than it is taken out, until the accumulator is full again.

The automatic adjustment of the height of the accumulator is accomplished, as is well known in the art, by the use of separate feed motors and tension controls at the input and output of the accumulator.

By use of the present invention as an accumulator, the accumulator can be as little as one-third of the height of accumulators formerly needed. This provides a major cost advantage in providing facilities for production.

The accumulator 254 works in the same manner as accumulator 248 to allow the release printer to run continuously and allow film to be taken up and stored at 258 and then taken to the developer 260, etc.

The release printing system resulting from the use of the invention is more compact and versatile, and enables the reduction of facilities and labor costs.

The storage and transport device of this invention is useful in other areas. For example, it can be used in a film developer, in both the wet and the dry sections. The invention also can be used in motion picture projection systems using an endless loop film to project a motion picture repeatedly—as is done at fairs, expositions and theme parks for example.

The above description of the invention is intended to be illustrative and not limiting. Various changes or modifications in the embodiments described may occur to those skilled in the art. These can be made without departing from the spirit or scope of the invention.

What is claimed is:

1. A multibank storage and transport device for storing and conveying an elongated moving flexible record medium, said storage means comprising a plurality of banks of successive loop-forming rollers, one of said banks being smaller than the other and being nested within the loops formed by said other bank and being adapted to transfer said record medium between said banks said device including a support structure having upper and lower support members, each of said banks of rollers having an upper array of rollers secured to said upper support member and an lower array of complementary rollers secured to said lower support member.

2. A device as in claim 1 including a mechanism for adjusting the distance separating said upper and lower support members.

3. A device as in claim 1 in which said record medium is motion picture film said rows of rollers in each bank arranged in opposed upper and lower sets, with each roller in said upper set being matched with a roller below it in said lower set, the first roller in the upper set being rotatably mounted on a first axle whose axis forms a first angle with a plane intersecting the centers of said rollers in said bank, the matching roller in the lower set being rotatably mounted on a second axle forming a second angle with said plane, said second angle being approximately equal to said first angle but being opposite in polarity, whereby said film is transferred from one vertical pair of rollers to the next.

4. A device as in claim 3 in which there are three of said banks of rollers, an inner bank, a middle bank, and an outer bank, with the rollers in said outer bank having the largest diameter, the rollers in the middle bank having a second diameter less than said largest diameter, and the rollers in said inner bank having a diameter smaller than that of the rollers in said middle bank.

5. A motion picture film printing system including a storage and transport device as in claim 1 and a film printer, said storage and transport device being connected to store and feed film to said printer.

6. A device as in claim 1 in which each of said rollers in said upper row being mounted to rotate about a first axis skewed in a first direction, and each of said rollers in said second row being mounted to rotate about a second axis skewed oppositely to the direction of skew of said first axis to facilitate transfer of said record medium between adjacent rollers in a row.

7. A multibank storage device for storing and conveying an elongated moving record medium, said storage means comprising a plurality of banks of successive loop-forming rollers, one of said banks being smaller than the other and being nested within the loops formed by said other bank and being adapted to transfer said record medium between said banks, said device including a support structure having upper and lower support members, each of said banks of rollers having an upper row of rollers secured to said upper support member and an lower row of complementary rollers secured to said lower support member, in which said rollers have axles and said support structure includes a plurality of mounting members for rotatably mounting each of the rollers in a given row to one of said upper and lower support members, each of said mounting members having a pair of axle-receiving, spaced-apart holes positioned to receive axles of said rollers aligned at a skew angle to one of said support members, the rollers in one row of said rollers having an angle of skew different from the angle of skew of the rollers in an adjacent row of rollers, said mounting members for one row having means for securing each of said mounting members to one of said mounting members in an adjacent row with variable skew.

8. A device as in claim 7 in which said means for securing comprises a single fastener extending along the aligned center lines of the mounting members attached together.

9. A multibank storage device for storing and conveying an elongated moving record medium, said storage means comprising a plurality of banks of successive loop-forming rollers, one of said banks being smaller than the other and being nested within the loops formed by said other bank and being adapted to transfer said record medium between said banks said device including a support structure having upper and lower support members, each of said banks of rollers having an upper row of rollers secured to said upper support member and an lower row of complementary rollers secured to said lower support member in which said rollers have axles and said support structure includes a plurality of mounting members for rotatably mounting each of the rollers in a given row to one of said upper and lower support members, each of said mounting members having a pair of axle-receiving, spaced-apart holes positioned to receive axles of said rollers aligned at a skew angle to one of said support members, each of said mounting members comprising a main body and a side insert with fastening means for releasably securing said side insert to said main body, each of said holes being formed partially in said main body and partially in said insert, whereby said side inserts can be removed to allow a roller and its axle to be removed and replaced.

10. A multibank storage device for storing and conveying an elongated moving record medium, said storage means comprising a plurality of banks of successive loop-forming rollers, one of said banks being smaller than the other and being nested within the loops formed by said other bank and being adapted to transfer said record medium between said banks, including a drive mechanism for driving said record medium through said storage device, said drive mechanism being located intermediate the ends of the length of record medium stored in said storage device, said storage device including a support structure having upper and lower support members, each of said banks of rollers having an upper row of rollers secured to said upper support member and an lower row of complementary rollers secured to said lower support member, said rows of said storage device being divided into two parts at a division location, with said record medium being transferred from one of said rows to the nearest adjacent row at said division location and being driven by said drive mechanism at said division location.

11. A motion picture film storage and transport device comprising, in combination, a support structure, a first bank of rollers mounted on said support structure and comprising an upper row of film rollers and a lower row of film rollers arranged to convey moving film upwardly and downwardly in successive loops formed over complementary pairs of rollers in said upper and lower rows, and a second bank of rollers secured to said support structure in the space between said upper and lower rows of rollers in said first bank, said second bank having upper and lower rows of rollers, said rollers having a diameter less than the diameter of said rollers in said first bank and being arranged to convey moving film upwardly and downwardly in successive loops formed over complementary pairs of rollers in said upper and lower rows of said second bank, said rollers in at least one of said upper and lower rows of one of said banks being positioned adjacent at least one roller in the other of said banks to allow said film to be transferred from one of said banks to the other.

12. A method of storing and transporting an elongated tape-form record medium, said method comprising the steps of (a) providing a first bank of successive loop-forming rollers, (b) locating a second bank of successive loop-forming rollers inside the loops formed by said first bank, said second bank being smaller than said first bank, and wherein the center lines of the rollers of each bank intersect at a given point, and (c) transferring said record medium from one of said banks to the other.

13. A method as in claim 12 in which said recording medium is motion picture film in an endless loop, and including the step of feeding said film through a film printer.

14. A method as in claim 12 in which said recording medium is motion picture film being supplied to a motion picture printer, and using the storage capacity of the storage device formed by said banks of rollers to accumulate film at one of the input and output of said printer to enable said printer to operate constantly at a relatively high rate of speed.

15. A storage device for storing and conveying an elongated record medium, said device comprising a mounting support, a first roller group having a first roller set comprising a plurality of record medium guide rollers mounted to rotate on said support about first axes, in which said rollers in said first roller set are spaced vertically from one another, and a second roller set comprising a plurality of record medium guide rollers mounted to rotate on said support about second axes, said rollers in said second set being spaced vertically from one another, and said second set being vertically spaced below said first set, the diameters of the rollers in said first set decreasing from the top roller to the bottom roller of said first set, and the diameters of the rollers in said second set increasing from the top roller to the bottom roller in said second set, and a plurality of said roller groups in close proximity to one another and spaced from one another in a direction transverse to the plane in which each of said rollers rotates and positioned to receive said record medium from another one of said groups.

16. A device as in claim 15 in which the rotational axes of corresponding rollers in the first and second sets are skewed oppositely to one another to facilitate the transfer of said record medium from one pair of rollers in a first of said groups to a corresponding pair of rollers in another one of said groups.

17. A device as in claim 16 including means for transferring said record medium to a second pair of corresponding rollers in said first and second sets.

* * * * *